United States Patent [19]

Catros

[11] Patent Number: 4,519,085

[45] Date of Patent: May 21, 1985

[54] DIFFERENTIAL DATA CODING AND DECODING PROCESS AND SYSTEM RESTRICTING PROPAGATION OF TRANSMISSION ERRORS

[75] Inventor: Jean Y. Catros, Paris, France

[73] Assignee: Thomson-CSF, Paris, France

[21] Appl. No.: 423,726

[22] Filed: Sep. 27, 1982

[30] Foreign Application Priority Data

Oct. 27, 1981 [FR] France .................. 81 20167

[51] Int. Cl.³ ............................................. H03K 13/22
[52] U.S. Cl. .................................. 375/27; 332/11 D; 358/135
[58] Field of Search .............. 375/27, 30, 31, 28, 375/122; 332/11 D; 358/132, 135, 138; 340/347 AD, 347 DA

[56] References Cited

U.S. PATENT DOCUMENTS

| | | | |
|---|---|---|---|
| 4,099,122 | 7/1978 | Van Buul | 375/30 |
| 4,179,710 | 12/1979 | Ishiguro et al. | 358/135 |
| 4,229,820 | 10/1980 | Enomoto | 375/27 |
| 4,292,651 | 9/1981 | Kretz et al. | 358/135 |
| 4,411,001 | 10/1983 | Van Buul et al. | 358/135 |

FOREIGN PATENT DOCUMENTS

12632 12/1978 France .................. 358/135

OTHER PUBLICATIONS

Van Buul "Hybrid D-PCM A Combination of PCM and DPCM IEEE on Communications vol. Com-20, Mar. 1978, pp. 362-368.

Maxemchuk "Performance of DPCM Coders for Picture Signals in Presence of Transmission Errors" Conference Board 1978, International Conf. on Communications vol. 1 4-7 pp. 12B.3.1-12B.3.6.

*Primary Examiner*—Robert L. Griffin
*Assistant Examiner*—Stephen Chin
*Attorney, Agent, or Firm*—Cushman, Darby and Cushman

[57] ABSTRACT

A differential coding-decoding system, in which the coder comprises a forecaster delivering, on the basis of a reconstructed value corresponding to a coded quantity, a forecaster P for the following quantity X to be coded, a forecast error quantizer delivering the difference $d = X - P$, and a forecast quantizer, the outputs of which are connected to a code allocator, the allocated code word transmitted for a quantity X to be coded being related, first to the forecast error quantization level $E_i$ formulated by the forecast error quantizer, and, second, to the quantized forecast $P_j$ formulated by the forecast quantizer; the codes allocated to successive forecast error zones corresponding to forecasts $P_j$ are always assigned in the same order, when j varies from minimum to maximum forecast error zones.

8 Claims, 7 Drawing Figures

DIFFERENTIAL DATA CODING AND DECODING PROCESS AND SYSTEM RESTRICTING PROPAGATION OF TRANSMISSION ERRORS

BACKGROUND OF THE INVENTION

1. Field of the invention

This invention concerns the transmission of images, more specifically television pictures, by means of data, the flow of which is reduced by coding, and more specifically a process and system for differential coding and decoding of data for restricting propagation of errors in the event of wrong transmission.

Differential pulse code modulation (DPCM) of television signals to be processed or transmitted in digital form, in order to compress the flow of data involved, is already well known.

Such coding involves coding the difference between the value of a sample video signal and an estimate, or forecast, of this value, calculated from previous samples already coded. Differences, referred to as "forecasting errors", are classified in zones around nought (0), these zones being limited by threshold values. All differences of values comprised between two thresholds, corresponding to the same level of quantization are coded in accordance with a constant coded combination $C_i$, corresponding to the zone of rank i situated between these two thresholds. Variations in the width of such zones, depending on their rank i higher than 0, determine what may be regarded as the compression characteristic, or quantization characteristic.

The problem to be solved by such coding is related to transmission errors.

If no precautions are taken, such methods are extremely sensitive to transmission errors, and a single such error can distort all subsequent decoded samples.

2. Description of the prior art

Various methods have been proposed to solve this problem.

One such method uses error-correcting codes for actual coding of quantized levels; these add redundancy bits to data bits before transmission. A problem with this technique is that after reduction of the flow of data to be transmitted by coding, an increase in flow is reintroduced by the addition of the redundancy bits, thereby defeating the P.

In another previously proposed method, a particular forecasting function is used to calculate the forecast, such as integration with loss, which prevents the error from being propagated beyond a certain distance.

A third proposed method consists essentially of analysing the signal received, in order to detect any change in its statistical properties caused by errors, thereby making it possible to correct the error later.

Finally, in another method, not only differences or errors in forecasting are coded, but also a forecasting error function, and the forecast itself.

These methods either increase data flow to correct errors, or do not allow enough correction to eliminate from reconstructed images any defects resulting from transmission error propagation.

French Pat. No. 2.408.945, and its certificate of addition No. 2.443.769, describe a method for reducing (coding) and expanding (decoding) of differential coding digital television signals, characterized by the choice of a quantization characteristic that, instead of being, symmetrical in relation to 0, as in earlier systems, non-symmetrical, as regards the number and values of quantization thresholds and levels. The certificate of addition more specifically concerns a method in which this quantization characteristic varies depending on the value of the forecast: the forecast variation range is divided up into forecasting zones, and each zone is assigned a quantization characteristic, which varies from one zone to the next, each such characteristic containing the same number of thresholds and levels of reconstruction, but the negative extreme levels differing from one forecasting zone to another.

This method has provided an improvement in images reconstructed from transmitted samples, since it doubles the number of possible reconstruction levels for the same number of transmitted bits; however, it does not prevent propagation of transmission errors.

SUMMARY OF THE INVENTION

This invention concerns a differential coding-decoding process related to the process described in the certificate of addition referred to above, in that the forecasting variation range is also divided up into zones. But in order to ensure self-correcting coding, allocation of code combinations related to forecasting differences or errors to be coded is related to the quantization characteristic, and variable from one forecasting zone to another, but invariable for all forcasting values contained in a single forecasting zone. The quantization characteristic may be symmetrical or non-symmetrical in relation to 0, as regards the number and values of thresholds and levels of reconstruction, or levels may be equidistant from one another. Similarly, the forecasting variation range may be divided up into equal or different-sized zones.

Error propagation is limited by assigning an individual code, which varies from one forecasting zone to another in relation to reconstruction levels, but which is kept identical between negative and positive extreme levels corresponding to different successive forecasting zones.

This invention concerns a differential digital data coding-decoding process reducing propagation of transmission errors, in which coding comprises quantizing the forecasting error between the digital quantity to be coded, and a forecast value of this same quantity (calculatd on the basis of reconstructed previous values) assigning a code word, selected from $2^k$ code words, to this quantized forecasting error, and transmitting it, and decoding comprises deducing from the code word received the corresponding forecasting error, then deducing the corresponding reconstructed value for a forecast calculated in the same way as for coding from reconstructed previous values, this process being characterized by the fact that it also comprises quantizing the actual forecast during coding and decoding, a code word being allocated to the quantized forecasting error during coding, on the basis of the quantized forecast, and the forecasting error being calculated during decoding, on the basis of the quantized forecast, a transmission error which during decoding causes an error in the corresponding quantized forecast for the following value being compensated for by calculation of the forecasting error, which takes this quantized forecast into account.

The invention also concerns a coding-decoding system to implement such a process.

BRIEF DESCRIPTION OF THE PREFERRED EMBODIMENTS

Further features and advantages of the invention will appear from the following description, with reference to the accompanying figures:

FIG. 1, showing a differential coding-decoding system in the prior art;

FIG. 2, showing one embodiment of this new coding-decoding system, with a single overall quantization characteristic;

FIG. 3, showing a diagram representative of a specimen code allocation in this new process, with a single overall quantization characteristic;

FIG. 4, showing a second embodiment of the coding-decoding system, with a single characteristic, using the quantized forecast for coding;

FIG. 5, showing a diagram representative of a second specimen code allocation, with multiple quantization characteristic;

FIG. 6, showing a third embodiment of the system, with multiple characteristic;

FIG. 7, showing a fourth embodiment of the system, with multiple quantization characteristic, using the quantized forecast for coding.

DESCRIPTION OF THE PREFERRED EMBODIMENTS

Figure 1:
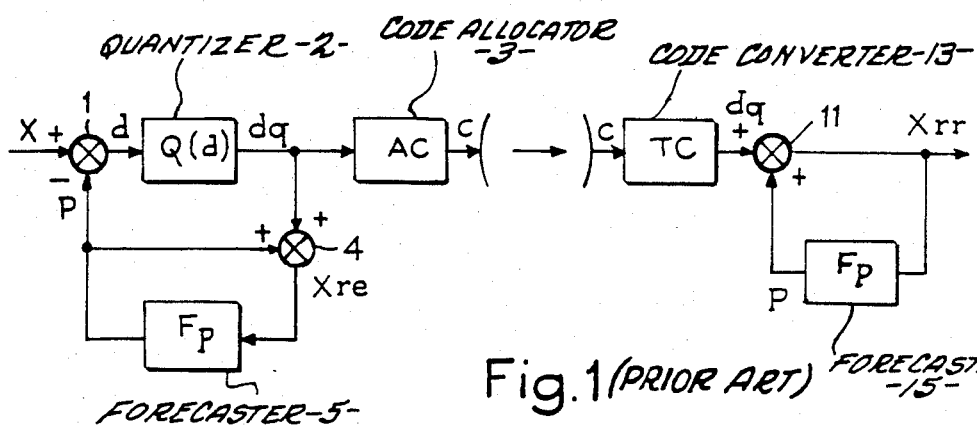

FIG. 1 shows a block diagram of a conventional DPCM coding-decoding system, the components of which bear references which will also be used in describing the invention.

The system comprises a coding part, which receives the digital quantity X for coding. This quantity may, for example, be one of $2^8$ different values transmitted in the form of 8-bit words. X is reduced by the forecast P in a subtracter circuit 1, to supply a difference (or forecasting error) d. This difference is fed into a quantizer (2), which, depending on the input difference, supplies a quantized difference dq with any one of n quantized levels $E_i$, where $i=0$ to $n-1$, as a function of the quantization characteristic Q(d). This is the operation that reduces data flow, since a single value or level of reconstruction $E_i$ is assigned to all differences $d=X-P$ between two thresholds $S_i$ and $S_{i+1}$. When $S_i$ exceeds d without exceeding $S_{i+1}$, the reconstruction level is $E_i$. The quantizer output is connected to the input of a code allocator AC (3), which supplies a variable code C: for each quantized level $E_i$, a given code $C_i$ is transmitted on the transmission line. If the code has a fixed length, a k-bit code can be assigned to a quantization characteristic with $n=2^k$ levels.

The forecast P is also obtained in the coder, from a reconstructed value $X_{re}$, obtained from the forecast P and quantized level dq for the previous sample, delivered to the inputs of an adder (4). The adder output is connected to the input of a forecaster (5), with a forecasting function $F_p$. The simplest forecast function gives the reconstructed value $X_{re}$, corresponding to the previous sample, to the forecast P for a given sample.

The decoder part comprises a code converter circuit CT (13), connected to the reception input, to convert code words into reconsruction levels. The reconstructed quantized level dq is fed into the input of an adder (11), the other input of which receives the forecast P, and which supplies the reconstructed value $X_{rr}$. The forecast is calculated from the reconstructed value $X_{rr}$ delivered to the input of a forecaster (15), with the same forecasting function $F_p$ as the coding forecaster (5).

In such a system, the forecast P is therefore established from reconstructed values $X_{re}$ in the coder and $X_{rr}$ in the decoder. If there has been any transmission error, the reconstructed quantized level, thus consequently the value of the reconstructed variable, and the forecast, as well contains errors, which are propagated to subsequent values.

As stated above, the performance of such a system has already been improved by including forecasting function quantization, but this does not reduce the rate of error.

A given code word $C_i$ is assigned to different forecasting error zones, and therefore to different reconstruction levels relating to forecasting zones, the forecasting variation range being divided up into zones, in which the forecasting error dynamic is only half the total dynamic of such an error. This means that only about half the number of codes is needed, compared with what would be necessary if a given code were always assigned to the same reconstruction level. With a code comprising words of k bits (e.g. $k=3$), it is possible to define a single quantization characteristic with $2^{k+1}-1$ levels (i.e. 15 levels), covering the whole dynamic $X-P$, and to transmit different codes each in function of the forecasting zone, only $2^k$ different codes being needed for each forecasting zone.

With a code comprising words of k bits, it is also possible to define as many quantization characteristics of $2^k$ levels as forecasting zones, since the number of such zones is no longer dependent on the number of bits in the code.

The new system provided by this invention also defines forecasting zones, but it uses a particular method of assigning code words to reconstruction levels, also related to forecasts, which helps to restrict propagation of transmission errors.

To this effect, codes are always allocated in the same order to successive quantization zones between minimum and maximum reconstruction levels for all forecasting zones, a system that reduces error propagation.

Figure 2:
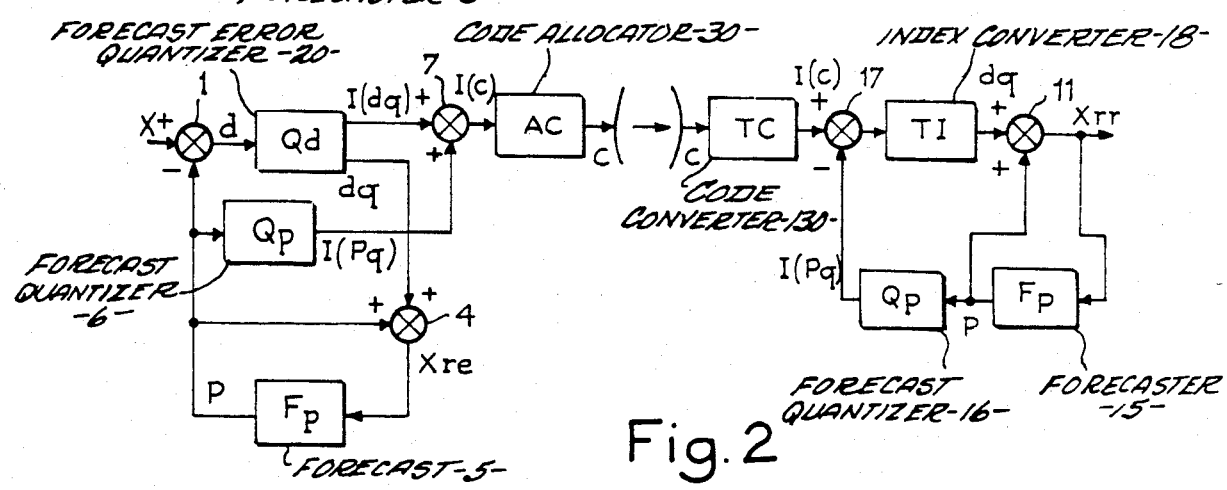

FIG. 2 shows one embodiment of this new system, in which code allocation is combined with a single overall quantization characteristic, which does not depend on the forecast value: only code allocation is related to forecasting.

As has been illustrated in FIG. 1, the coding part of this system receives data X for coding, connected to one input of a subtracter circuit (1), the second input of which receives the forecast P supplies by a forecaster (5). But it also comprises a forecast error quantizer (20), with one output supplying the quantized difference dq as above, and a second output supplying the index I(dq) for the corresponding quantization zone in the quantization characteristic divided into $2^{k+1}-1$ zones by $2^{k+1}$ thresholds. The first quantizer output is connected to the first input of an adder (4), the second input of which receive the forecast P, and which, as in the earlier system, supplies the reconstructed value $X_{re}$ to the forecaster input. The coder also contains a forecast quantizer (6), the input of which is connected to the forecaster output, and which supplies, in relation to the forecast quantization characteristic $Q_p$, the index $I(P_q)$ of the quantized forecast zone. The output from this quantizer is connected to the input of an adder (7), the second input of which receives the quantized forecast error zone index. The adder output is connected to the input of a code allocator AC (30), which, on the basis of the sum of indices I(dq) and I($P_q$), supplies a code C, which is transmitted along the line.

Figure 3:
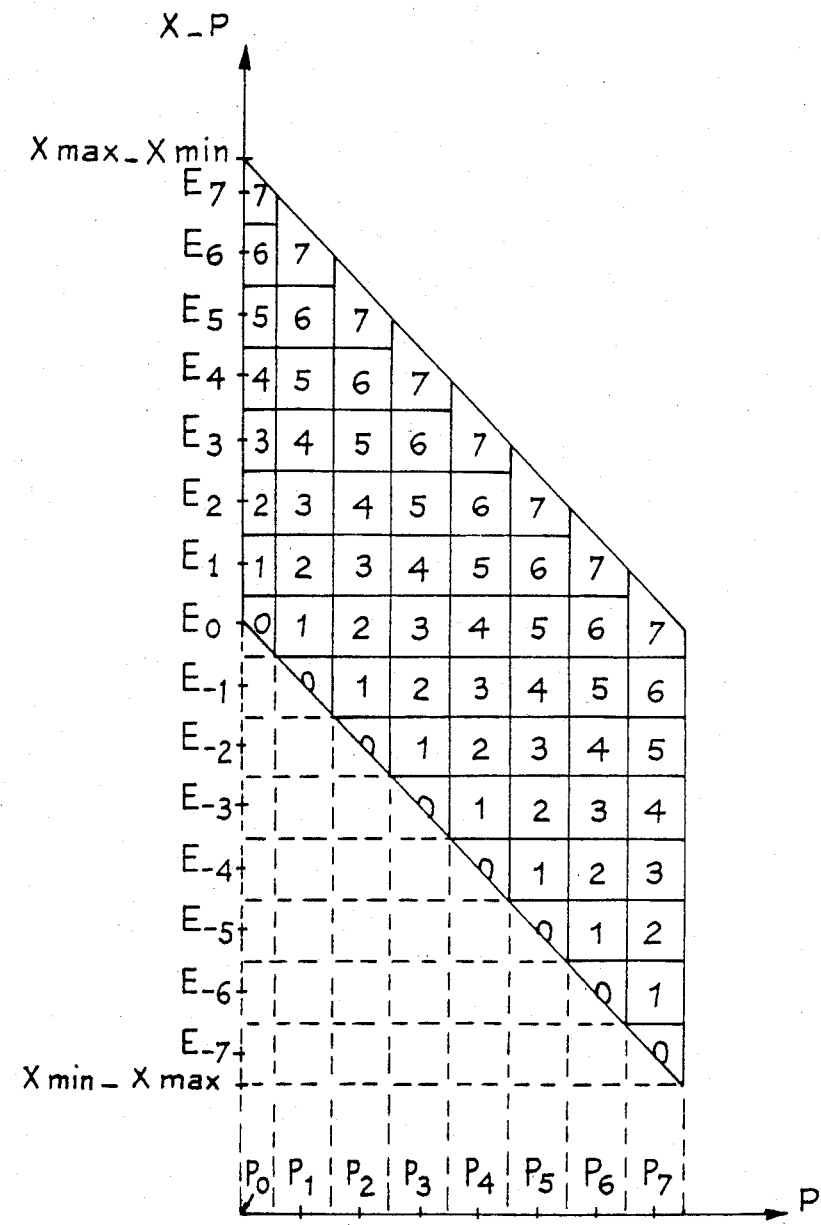

FIG. 3 illustrates this specific code allocation for a coding-decoding system in which k=3, with a single overall quantization characteristic. The forecast error quantizer (20), the characteristic Q(d) of which contains $2^{k+1}$ thresholds, equidistant on the figure, defines $2^{k+1}-1$ zones quantized in $2^{k+1}-1$ levels: $E_i$ ($E_{2k-1}$, $E_{-2k} \ldots E_o, \ldots, E_{2k}, E_{2k+1}$), with i belonging to the set $A=\{-(2k+1), \ldots (2k+1)\}$, and at a given time supplies the values $dq=E_i$ and $I(dq)=i$.

Similarly, the forecast quantifier (6), the quantization characteristic Q(P) of which contains $2^k$ zones, defines quantized forecasts $P_j$, where j belongs to the set B={0 ... $2^k-1$}, equidistant and with the same width as forecast error zones; $P_o=0$ and the first zone is equal to half the following zones.

This quantizer supplies the index I(Pq)=j.

The assigned code C is connected with the index m=i+j, where m=(0, 1, 2 ... $2^k-1$), which means that when a given index m is obtained at the output from the adder (7), the transmission code is $C_m$.

In other words, for code zones defined as:

... ($E_{i-2}$, $P_{j+2}$); ($E_{i-1}$, $P_{j+1}$), ($E_i$, $P_j$), ($E_{i+1}$, $P_{j-1}$).
..., the same code number is obtained and the same code is transmitted.

In the example of code allocation in FIG. 3, the coder with k=3 binary components gives $2^3$=8 code words marked 0 to 7. The forecast error X−P quantization characteristic therefore comprises $2^{3+1}-1$ zones, i.e. 15 zones, which in the figure are equal, and therefore 15 levels $E_{-7}$, $E_{-6} \ldots E_0$, $E_1 \ldots E_7$, which have been chosen equidistant—although zones need not be equal or reconstruction levels equidistant in this system. The forecasting range is divided up into $2^3$=8 forecast zones, corresponding to equidistant quantized forecasts $P_0 \ldots P_7$. Consequently, codes assigned to the various code zones are obtained by adding quantized level indices i and quantized forecast indices j corresponding to such code zones.

The decoding part of the coding-decoding system illustrated in figure 2 comprises a code converter TC (130), which, on the basis of the code received, supplies the corresponding index I(C), and the output of which is connected to the input of a subtracter circuit (17). The second input of this circuit receives the quantized forecast index I($P_q$) from a forecast quantize (16) with the same forecasting function $Q_p$ as the coder quantizer (6). The subtraction circuit output is connected to the input of an index converter circuit TI (18), to convert the index I(dq) into a forecast error dq. This circuit output is connected to one input of an output adder (11), the output of which supplies the reconstructed value $X_{rr}$. As in the system in FIG. 1, this output is connected to the input of a forecaster (15), with the same forecasting function $F_p$ as the coding forecaster (5), and the output of which is connected to the second input of the output adder (11), and to the forecast quantizer input.

Figure 4:
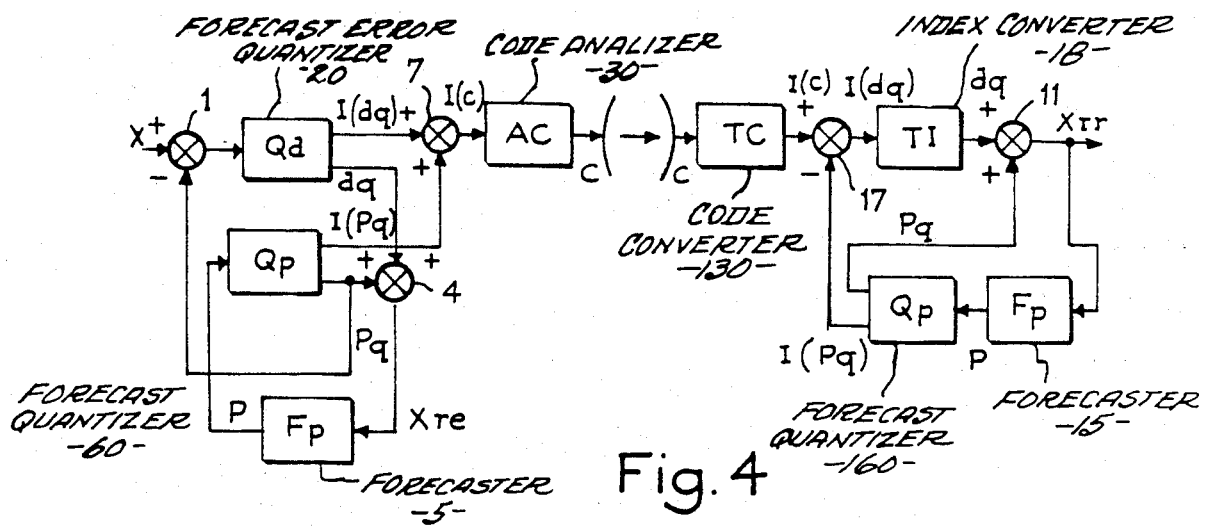

The coding-decoding system in FIG. 4 resembles the system shown in FIG. 2, except that instead of using the forecast P from the forecaster (5) in the differential coding loop, it uses the quantized forecast Pq.

To this effect, the forecaster (6) is replaced by another forecaster (60) which, in addition to the forecast zone index I($P_q$), supplies the actual quantized forecast $P_q$. This quantized forecast is supplied, instead of the forecast P, first to the second input of the substracter (1), and secondly to the second input of the adder (4), the output of which supplies the reconstructed value $X_{re}$. Other components of the coder are connected in the same way as in FIG. 2.

In the decoder part of the system in FIG. 4, component parts are also connected in the same way as in FIG. 2, except that the quantized forecast is used and not the forecast itself to calculate the reconstructed value. To this effect, a forecast quantizer (160) comprises, like the coder forecast quantizer (60), a second output supplying the quantized forecast $P_q$; this output is connected to the second input of the output adder (11), supplying the reconstructed value $X_{rr}$.

A system of this kind, in its first or second version, brings about a considerable reduction in transmission error.

At the time $t_1$, there is assumed to be a transmission error. This results at the decoder output in a reconstructed variable which is wrong in relation to the value coded in the coder. This error still exists. But in addition, it produces an error in calculation of the forecast P. At $t_2$, the forecast values calculated in the transmitter and receiver are therefore different: P in the transmitter and P′ in the receiver. The next value transmitted is established in the transmitter from the input numerical value X and the forecast P. If it is assumed that this transmitted value is received in the receiver, the reconstructed value in the receiver will be calculated from a correct value received and a wrong forecast P′. $P_j$ and $P'_j$ are the quantized forecasts supplied by the outputs from the forecast quantizers (60 and 160), in the coder and decoder respectively. The code $C_m$ has been transmitted, and so the level of reconstruction in the coder is $E_i$, where $i=m-j$. The reconstructed level in the decoder is $E'_{i'}$, where $i'=m-j'$. Reconstructed values in the coder are $X_{re}=P+E_i$, if the forecast is used in the differential coding loop, and $X_{re}=E_i+P_j$ when the quantized forecast is used.

The reconstructed value in the decoder is $X_{rr}=P'+E'_i$ or $X_{rr}=E'_{i'}+P'_j$, depending on whether the forecast or quantized forecast is used in the differential coding loop.

The difference between the reconstructed values is: $X_{re}-X_{rr}=P-P'+E_{m-j}-E_{m-j'}$ or $P_j-P'_{j'}+E_{m-j}-E_{m-j'}P-P'=(P_j+e)-(P'_j+e')$, where e and e′ are forecasting errors resulting from quantization or quantic "noise".

$P_j-P'_j$ and $E_{m-j}-E_{m-j'}$ are usually approximately the same in absolute value, both these sums also being of opposite signs. The difference therefore tends to be cancelled out, whereas, in the conventional system shown in FIG. 1, the difference between the reconstructed values $X_{re}-X_{rr}$ during a transmission error is equal to P−P′.

If quantized forecast error levels and quantized forecasts are such that:

$E_i=ai+b$ where i belongs to set A $P_j=aj+c$ where j belongs to set B which is the case in the example shown in FIG. 3, then $X_{re}-X_{rr}=e-e'$ when the forecast is used in the differential coding loop (the reconstruction error being at most the length on one quantization interval) and $X_{re} - X_{rr} = 0$ when the quantized forecast is used.

For example, with reference to the diagrams in FIG. 3:

At time $t_1$, the forecast $P_j = P_2$ at the transmitter and receiver. A value X in the transmitter gives a difference $d = X - P_2$, quantized in a reconstruction level $E_1$. This level $E_1$, with the forecast $P_2$, corresponds to a transmitted code $C_m$ where $m = 3$. The forecast for the next value is calculated on the basis of the preceding forecast $P_2$ and the preceding reconstruction level $E_1$. For example, this forecast is $P_j$ where $j = 3$, if the forecast is taken to be the same as the previous reconstructed value. If a transmission error is assumed to occur at time $t_1$, the code $C_{m'}$ where $m' = 5$, for example, will be received. This code $C_5$, with forecast $P_2$, gives a reconstruction level $E_i$, where $i = m' - j = 3$, i.e. a reconstruction level $E_3$. The forecast value calculated for the following sample in the receiver is therefore $E_3 + P_2$, i.e. $P'_{j'}$, where $j' = 5$.

At time $t_2$, the forecasts are thus $P_j$ at the transmitter where $j = 3$, and $P'_{j'}$ at the receiver where $j' = 5$. A subsequent sample X, with the forecast $P_j$ at the transmitter, therefore gives a difference d, quantized, for example, in the corresponding interval at reconstruction level $E_{-1}$. This level, with forecast $P_3$, gives a transmitted code $C_m$, where $m = 3 - 1 = 2$.

The reconstructed value $X_{re} = P_3 + E_{-1}$ i.e. $E_2$. If it is assumed that there has been no error of transmission at this time $t_2$, code $C_2$ will be received. The forecast at that time is $P_5$, and the reconstruction level is therefore $E_{i'}$ where $i' = m - j' = 2 - 5 = -3$. The reconstructed value $X_{rr}$ is therefore equal to $P_5 + E_{-3} = E_2$. Clearly, when the quantized forecast is used in the different coding loop, the error is completely cancelled out for the following sample.

Instead of choosing a single overall quantization characteristic for all forecasting quantization zones, it is also possible to use a multiple characteristic, i.e. a quantization characteristic which varies from one forecasting zone to the following, as regards thresholds and levels of reconstruction, but the form of which is identical for all forecast intervals. Consequently, if there is a k-bit code, and therefore $2^k$ code words, the scale of forecasting error quantization comprises $2^k$ levels of reconstruction, this scale being regarded as identical for all forecasting zones, simply by staggering minimum and maximum levels, which are dependent on the relevant forecasting zone. Forecast quantization may be of any suitable form, as regards both arrangement of quantization intervals and their number.

Figure 5:
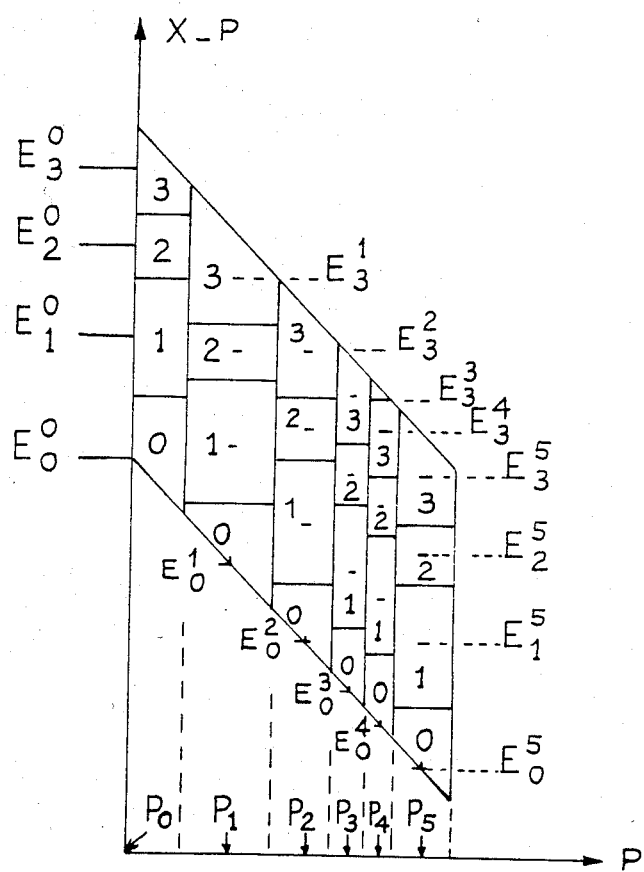

Consequently, in the example in FIG. 5, the code contains two binary elements, i.e. $k = 2$, namely 4 code words identified by their indices m from 0 to 3. Any form of forecast quantization is used. With a fixed forecast $P_j$, the four levels of forecast error quantization can be chosen independently. On the other hand, once settled, this partial characteristic is repeated identically for all forecast intervals, as is the corresponding code allocation Let $E_i^j$ be the quantized forecast error in the forecast error quantization zone i and forecast zone j.

FIG. 5, for example, contains levels $E_0^j$, $E_3^j$, $E_i^0$ and $E_i^5$, where $i = 0$ to 3 and $j = 0$ to 5.

As already stated, reconstruction levels, or quantized forecast errors, can be of any form, but their scale must be such that $E_i^j$ is greater than $E_i^{j+1}$. Under such conditions, as in the previous case, a transmission error will not be propagated, because the difference $X_{re} - X_{rr}$ tends to be cancelled out during subsequent coding and decoding operations.

In addition, if quantized error reconstruction levels are, in relation to the quantized forecast, such that $E_i^j = E_i^0 - P_j$ (equation 1), the error is completely cancelled for the subsequent sample, or is at most equal to the width of one quantization interval, depending on whether the quantized forecast or actual forecast is used in the differential coding loop.

When an error has occurred at time $t_1$, the quantized forecasts $P_j$ and $P'_{j'}$ are different. To calculate the following value, a difference d is quantized in the transmitter by level $E_i^j$, causing transmission of a code with index i, and this is then in fact transmitted.

The quantized different in the receiver is then $E_i^{j'}$, with the forecast $P_{j'}$. The reconstructed values $X_{re}$ in the transmitter and $X_{rr}$ in the receiver are:

$X_{re} = P_j + E_i^j$ and $X_{rr} = P_{j'} + E_i^{j'}$, which, because of the construction of the characteristic (cf. equation 1 above), are both equal to $E_i$.

If the simple forecast is used in the loop, $X_{re} - X_{rr} = e - e'$.

For example, with reference to the diagram in FIG. 5:

At time $t_1$, the forecast $P_j = P_2$ at transmitter and receiver. A quantity X for coding produces a difference in the transmitter $d = X - P_2$, quantized as level $E_3^2$, for example, which results in transmission of a code with index 3. The forecast for the following value is calculated from $P_2$ and $E_3^2$, taken to be equal to the reconstructed value $X_{re} = P_2 + E_3^2 = E_3^0$, i.e. forecast $P_3$.

Code 1, for example, is received, because of a transmission error. With the forecast $P_2$, the reconstructed quantized level is $E_1^2$, and the reconstruction value is $X_{rr} = E_1^2 + P_2 = E_1$, i.e. forecast $P_1$.

At time $t_2$, the quantity X, with forecast $P_3$, gives a quantized level $E_1^3$ at the transmitter, for example, i.e. a code with index 1 transmitted, and properly received. The reconstructed value at the transmitter is $X_{re} = E_1^3 + P_3 = E_1^0$.

The reconstructed value at the receiver, from forecast $P_1$, i.e. from the reconstructed level $E_1^1$, is $X_{rr} = E_1^1 + P_1 = E_1^0$. Both reconstructed values are equal, as are forecasts for the next time.

Figure 6:
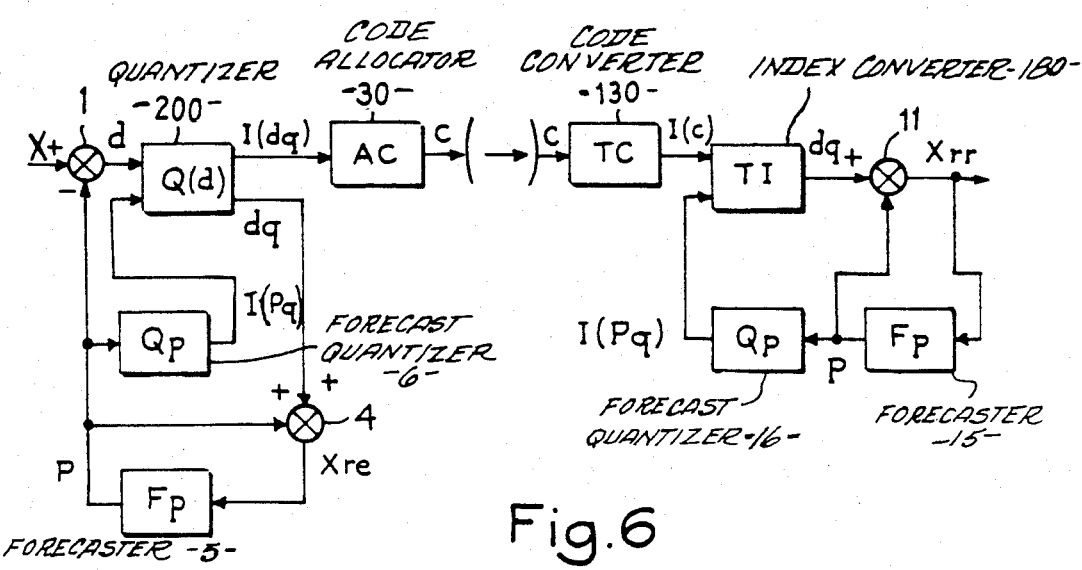

A coding-decoding system with this multiple characteristic, in which the simple forecast is used in the differential coding loop, is illustrated in FIG. 6, where the same component parts as on earlier figures bear the same references.

The numerical quantity X for coding is delivered to the positive input of a subtracter (1), the negative input of which receives the forecast P from a forecaster (5) possessing a forecasting function $F_p$. The difference $X - P = d$ is supplied to the input of an error quantizer 200, the quantization function Q(d) of which varies depending on the index of the quantized forecast. For this purpose, this quantizer comprises a second input, receiving the index $I(P_q)$ of the quantized forecast from a forecast quantizer (6), the input of which receives the forecast P. This forecast error quantizer (200) delivers the quantized error dq at one output, and the index of this quantized error in the forecast error scale at a second output. The first output is connected to the input of an adder (4), the second input of which receives the forecast P. The output from this adder delivers the reconstructed value $X_{re}$ to the input of the forecaster (5). The second output from the forecast error quantizer (200) is connected to the input of a code allocator (30), the output of which supplies the code C among values $C_m$ where m=0 to $2^k$. In the decoder, the coding-decoding device comprises a code converter (13), which, from the code C received, supplies the index for this code I(C)=m. This value is delivered to the first input of an index/forecast error converter (180), the second input of which receives the quantized forecast index supplied by the output of a forecast quantizer (16). The index converter output delivers the quantized error dq to the first input of an output adder (11), the output of which delivers the reconstructed value $X_{rr}$, to the input of a forecaster (15), similar to the coder forecaster (5), and the output of which delivering the forecast value P is connected to the second output adder input and to the forecast quantizer input.

As the description above shows, this coding-decoding system is quite similar to the one shown in FIG. 2, except that the forecast error quantizer (200) determines reconstructed levels and corresponding indices in relation to the forecast P, and more specifically the index of the corresponding quantizer forecast. At the receiver, in the same way, the index converter (180) takes account, first, of the received code index and, second, of the quantized forecast index.

Figure 7:
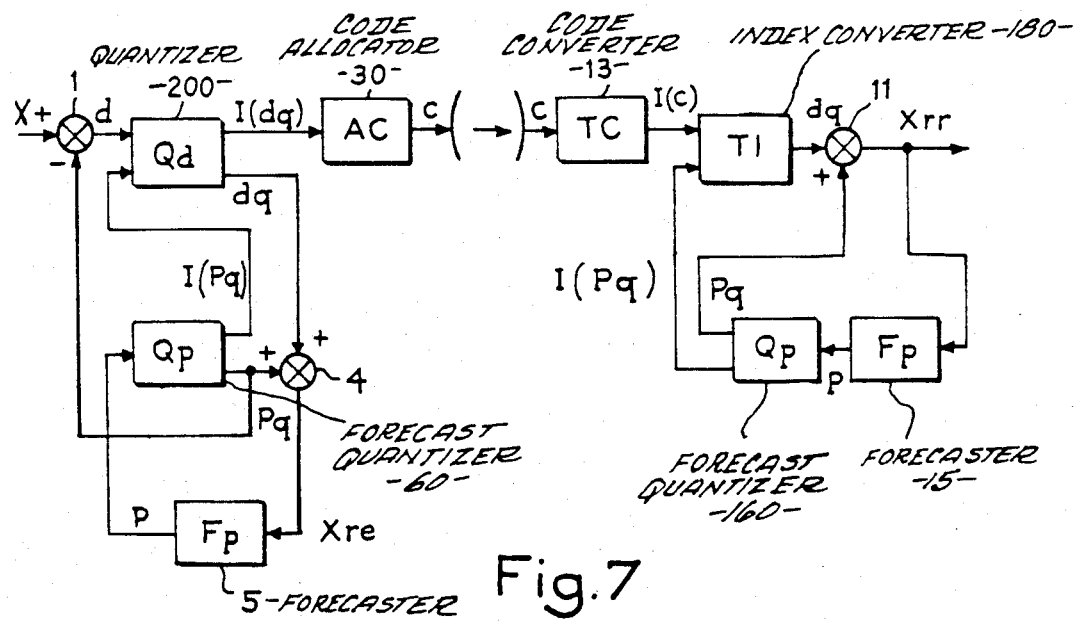

FIG. 7 shows a coding-decoding system similar to the one in FIG. 4, as regards the differential coding loop, which uses the quantized forecast, and similar to the one shown in FIG. 6, as regards the forecast error quantization characteristic, which is multiple, and related to the forecast.

This system consequently comprises the input subtracter (1) which receives the quantity X for coding, and the quantized forecast $P_q$. The output from this circuit is connected to one input of the forecast error quantizer (200), the second input of which receives the quantized forecast index $I(P_q)$ from the first output of a forecast quantizer (60). The forecast error quantizer (200) possesses two outputs, one of which, on the basis of the error d, delivers the quantized forecast error dq, and the other of which delivers the index for this quantized error, in relation to the corresponding forecast index. The first output of the quantizer is connected to the first input of an adder (4).

The second output of the forecast quantizer (60) delivers the quantized forecast $P_q$, first to the second adder input (4), and second, as described above, to the second subtracter input. As above, the adder (4), which delivers the reconstructed value $X_{re}$, is connected to the input of a forecaster (5), the output of which delivers the forecast P to the forecast quantizer input. The second forecast error quantizer output, which delivers the quantized difference index, is connected to the input of a code allocator (30), the output of which delivers the code for transmission.

The decoder of this system supplies the received code C to the input of a code converter (13), the output of which delivers the received code index I(C), to the first input of the index concerter (180), the second input of which receives the quantized forecast index $I(P_q)$, delivered by the first output of a forecast quantizer (160), the second output of which is connected, as above to the second input of an adder (11), the first input of which receives the quantized error dq from the index converter (180). This output adder delivers the reconstructed value $X_{rr}$ to the input of a forecaster (15), the output of which is connected to the forecast quantizer input.

This invention is in no way confined to the embodiments described above, with the corresponding code assignments.

What is claimed is:

1. A differential digital data coding-decoding process reducing propagation of transmission errors, comprising the steps of:
(A) coding a signal to be transmitted, said coding including the steps of:
   (a) quantizing a forecasting error between a digital quantity to be coded, and a forecast value of said digital quantity, calculated on the basis of reconstructed previous values of said digital quantity, (b) quantizing the forecast value and (c) assigning a code word, selected from $2^k$ (where k is an integer) code words, to the quantized forecasting error, the code word being based at least in part on the quantized forecast value,
(B) transmitting the assigned code word, and
(C) receiving the transmitted code word and, decoding it, the decoding including the steps of (a) deducing from the code word received the corresponding forecast error and forecast value, then (b) deducing the corresponding reconstructed value for a forecast calculated in substantially the same way as for coding, from reconstructed previous values, the forecasting error being calculated during decoding, on the basis of the quantized forecast, a transmission error which during decoding causes an error in a corresponding quantized forecast value for a following value being compensated for calculation of the forecasting error, which takes this quantized forecast into account.

2. A process as defined in claim 1, in which the forecast error quantization characteristic is a single overall characteristic covering all possible values of the forecast error, calculation of the quantized forecast error therefore not being dependent on the quantized forecast, only code allocation being related to the said quantized forecast.

3. A process as defined in claim 1, in which a partial quantization characteristic with $2^k$ levels is defined for each quantized forecast, and quantized forecast error is calculated on the basis of the quantized error and the forecast error, code allocation therefore being based on a variable quantized forecast error and on the forecast with constant forecast error.

4. A coding-decoding arrangement, comprising:
a transmitter including a subtracter, a first input of which receives a quantity X for coding a second input of which receives a forecast value, and an output of which is connected to an input of a forecast error quantizer defining predetermined forecast error quantization levels dq, an adder having an input which receives the quantized error dq, and the second input of which receives the forecast value, and the output of which is connected to the input of a forecaster delivering a forecast P, a forecast quantizer connected to the forecaster output, defining quantized forecasts, and
a receiver including a code/forecast error converter circuit, an output adder, a first input of which is connected to an output of the converter circuit, and a second input of which receives a forecast value, a second forecaster substantially similar to the transmitter forecaster, connected to the output adder output, and a second forecast quantizer, substantially similar to the transmitter forecast quantizer, connected to the second forecaster output, the arrangement further comprising a code allocator in the transmitter, connected to receive the forecast error quantization levels and quantized forecast for allocating a code word form $2^k$ words to the forecast error quantization level, on the basis of the quantized forecast, each such quantized forecast being associated with $2^k$ forecast error quantization levels, divided up in the same way between extreme levels and coded by the $2^k$ code words, such words being allocated to successive quantization levels always in the same order between extreme levels associated with different quatized forecasters, one input of the code converter in the receiver being connected to the forecast quantizer output.

5. A system as defined in claim 4, in which the $2^k$ forecast error quantization levels, for a given quantized forecast, form part of a single overall quantization characteristic with $2^{k+1}-1$ levels $E_i$, where i belongs to the set $\{-(2k+1) \ldots (+2k+1)\}$ covering all possible forecast error values, the forecast error quantizer having a single input connected to the subtracter output, forecast error quantization levels $E_i$ and forecast quantization levels $P_j$, where j belongs to the set $\{0 \ldots 2^k-1\}$ being such that $E_i = ai + b$ and $P_j = aj + c$, where a, b and c are given coefficients.

6. A system as defined in claim 4, in which the $2^k$ forecast error quantization levels $E_j$, where i belongs to the set $\{0 \ldots 2^k-1\}$, for a given quantized forecast $P_j$, form a partial quantization characteristic, reproduced in successive quantized forecast zones after staggering, in relation to the characteristic corresponding to the first quantization interval $P_o$, of the corresponding quantized forecast value $P_j$, one input of the error quantizer being connected to the subtractor output, and another input being connected to the forecast quantizer output.

7. A system according to claim 4, 5 or 6, in which the forecaster output in the transmitter is connected to the second input of the subtractor and to the second input of the adder, and the forecaster output in the receiver is connected to the second input of the output adder, the forecast value used for differential coding and decoding being the forecast P delivered by the corresponding forecaster output.

8. A system according to claim 4, 5 or 6, in which one output of the forecast quantizer in the transmitter is connected to the second input of the subtractor and to the second input of the adder, and one output of the forecast quantizer in the receiver is connected to the second input of the output adder, the forecast value used for differential coding being the quantized forecast $P_q$ delivered by the corresponding forecast quantizer.

* * * * *